(12) United States Patent
Gray et al.

(10) Patent No.: US 7,740,980 B2
(45) Date of Patent: Jun. 22, 2010

(54) ELECTRODE INCLUDING A MULTI-REGION CURRENT COLLECTOR

(75) Inventors: John M. Gray, Brooklyn Park, MN (US); Christopher J. Gaertner, Saint Paul, MN (US)

(73) Assignee: Medtronic, Inc., Minneapolis, MN (US)

( * ) Notice: Subject to any disclaimer, the term of this patent is extended or adjusted under 35 U.S.C. 154(b) by 956 days.

(21) Appl. No.: 11/379,976

(22) Filed: Apr. 24, 2006

(65) Prior Publication Data

US 2007/0248878 A1 Oct. 25, 2007

(51) Int. Cl.
*H01M 4/00* (2006.01)

(52) U.S. Cl. .................. 429/128; 429/163; 429/209; 429/233

(58) Field of Classification Search ............ 429/122, 429/163, 175, 176
See application file for complete search history.

(56) References Cited

U.S. PATENT DOCUMENTS

| | | | |
|---|---|---|---|
| 5,716,729 A | 2/1998 | Sunderland et al. | |
| 6,238,813 B1 * | 5/2001 | Maile et al. | 429/9 |
| 6,593,028 B1 * | 7/2003 | McCormick | 429/131 |
| 6,893,772 B2 | 5/2005 | Howard | |
| 2005/0221192 A1 | 10/2005 | Hennige et al. | |

* cited by examiner

*Primary Examiner*—Dah-Wei D Yuan
*Assistant Examiner*—Patricia Davis

(57) ABSTRACT

An electrochemical cell is provided that includes a current collector plate and a pellet. The current collector plate includes a circumferential outer peripheral wall and an inner wall coupled thereto, where the circumferential outer peripheral wall defines a cavity and has a height, and the inner wall extends across and physically separates the cavity into at least two regions and has a height that is less than the height of the circumferential outer peripheral wall. The pellet comprises active powder material and is disposed in the cavity and circumferentially surrounded by and in contact with the circumferential outer peripheral wall of the current collector plate. The pellet includes a first portion and second portion, where the first portion is disposed in a first region of the at least two regions and the second portion is disposed in a second region of the at least two regions.

19 Claims, 5 Drawing Sheets

US 7,740,980 B2

ELECTRODE INCLUDING A MULTI-REGION CURRENT COLLECTOR

FIELD OF THE INVENTION

The present invention generally relates to implantable medical devices, and more particularly relates to an electrochemical cell including a cathode assembly having a multi-region current collector.

BACKGROUND OF THE INVENTION

Implantable medical devices (IMDs) are well known for providing a variety of treatments. For example, implantable cardiac defibrillators are used to monitor cardiac activity, detect ventricular fibrillation, and in response to that detection, deliver appropriate therapy pulses to restore a normal heart rhythm. Implantable neurostimulators have been used to stimulate the spinal cord and brain for, for example, the treatment of chronic pain and peripheral vascular disease. Implantable pacemakers generate and apply electric stimuli in the form of pulses to heart tissue to control the timing of heart contractions.

IMDs, and other similar devices, utilize an internal power source (i.e. an electrochemical cell) to provide the power required for operation. The electrochemical cell typically includes at least an anode and a cathode. In some embodiments, the electrochemical cell includes a cathode assembly having a powdered cathode material compressed into a disk-shaped pellet and a circumferential current collector disposed therearound. The circumferential current collector increases conductivity of current to the cathode material by maintaining low resistance and exerts a sufficient hoop force magnitude on the pellet to maintain its disk shape and allow for pellet growth during discharge.

Although the above-described cathode assembly performs well when implemented in an electrochemical cell, it has certain drawbacks. For example, in some instances, the hoop forces exerted by the circumferential current collector may be too high and may cause the disk-shaped pellet to dome. As a result, the overall thickness of the cathode assembly may undesirably increase. Consequently, it may become difficult, or even impossible, to insert the cathode assembly into the electrochemical cell. Additionally, the disk-shaped pellet typically expands as the cathode assembly is discharged. This expansion may cause degradation of contact between the cathode material and the circumferential current collector and may undesirably change the overall impedance of the cell as it discharges over time. Eventually, the change in cell impedance may cause a decrease in cell capacity. As IMDs and electrochemical cells become thinner, these issues may become more pronounced.

Accordingly, it is desirable to have a cathode assembly that can maintain its original configuration over time so that it may be easily assembled into an electrochemical cell. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An electrochemical cell is provided that includes a current collector plate and a pellet. The current collector plate includes circumferential outer peripheral wall and an inner wall coupled to the circumferential outer peripheral wall, where the circumferential outer peripheral wall defines a cavity and has a height, and the inner wall extends across and physically separates the cavity into at least two regions and has a height that is less than the height of the circumferential outer peripheral wall. The pellet comprises active powder material and is disposed in the cavity and circumferentially surrounded by and in contact with the circumferential outer peripheral wall of the current collector plate. The pellet includes a first portion and second portion, where the first portion is disposed in a first region of the at least two regions and the second portion is disposed in a second region of the at least two regions.

In another embodiment, the current collector plate includes a circumferential outer peripheral wall and an inner wall coupled to the circumferential outer peripheral wall. The circumferential outer peripheral wall defines a cavity and has a height. The inner wall extends across and physically separates the cavity into at least two regions and has a height that is substantially equal to the circumferential outer peripheral wall height. A plurality of pellets is included and comprises a compressed active powder circumferentially surrounded by the circumferential outer peripheral wall of the current collector plate, and each pellet is disposed in a corresponding region of the cavity.

In still another embodiment, the electrochemical cell includes an anode and a cathode assembly. The cathode assembly includes a current collector plate and a pellet. The current collector plate includes a circumferential outer peripheral wall and an inner wall coupled to the circumferential outer peripheral wall, where the circumferential outer peripheral wall defines a cavity and has a height, and the inner wall extends across and physically separates the cavity into at least two regions and has a height that is less than the height of the circumferential outer peripheral wall. The pellet comprises active powder material and is disposed in the cavity and circumferentially surrounded by and in contact with the circumferential outer peripheral wall of the current collector plate. The pellet includes a first portion and second portion, where the first portion is disposed in a first region of the at least two regions and the second portion is disposed in a second region of the at least two regions.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the scope, applicability, or configuration of the invention in any way. Rather, the following description provides a convenient illustration for implementing exemplary embodiments of the invention. Various changes to the described embodiments may be made in the function and arrangement of the elements described herein without departing from the scope of the invention. Although the invention is described below as being implemented into a medical device, it may alternatively be implemented in any one of numerous other devices in which one or more powder pellets may need to be disposed in a plate.

Figure 1:
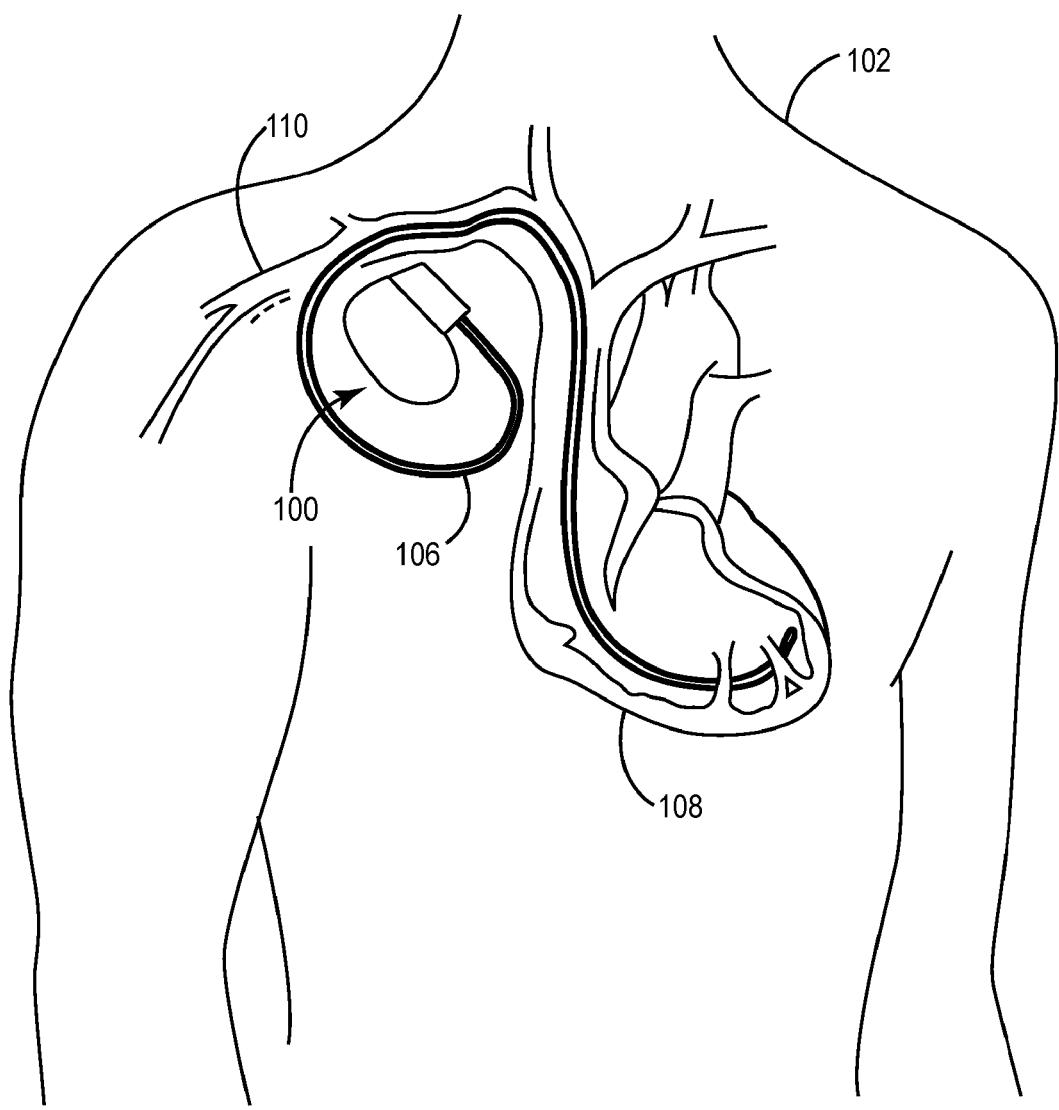
FIG. 1 is a diagram showing a typical placement of an IMD in a user.

FIG. 1 is an illustration showing generally where an implantable cardiac device (IMD) 100 (e.g. a defibrillator) may be placed in a patient 102. One or more leads 106 are electrically coupled to IMD 100 in a conventional manner and extend into the patient's heart 108 via a vein 110. Disposed generally near the distal end of lead 106 are one or more exposed conductive electrodes for sensing electrical cardiac signals and/or for delivering electrical stimuli or other therapies to heart 108. Lead 106 may be implanted with its distal end in either the atrium or the ventricle of heart 108. Lead 106 is preferably a bipolar lead such that lead 106 actually has two separate and mutually insulated leads, the first having a terminal at the distal end of lead 106 and the second having a terminal near, but set back from the distal end. Such leads are well known in the art.

Figure 2:
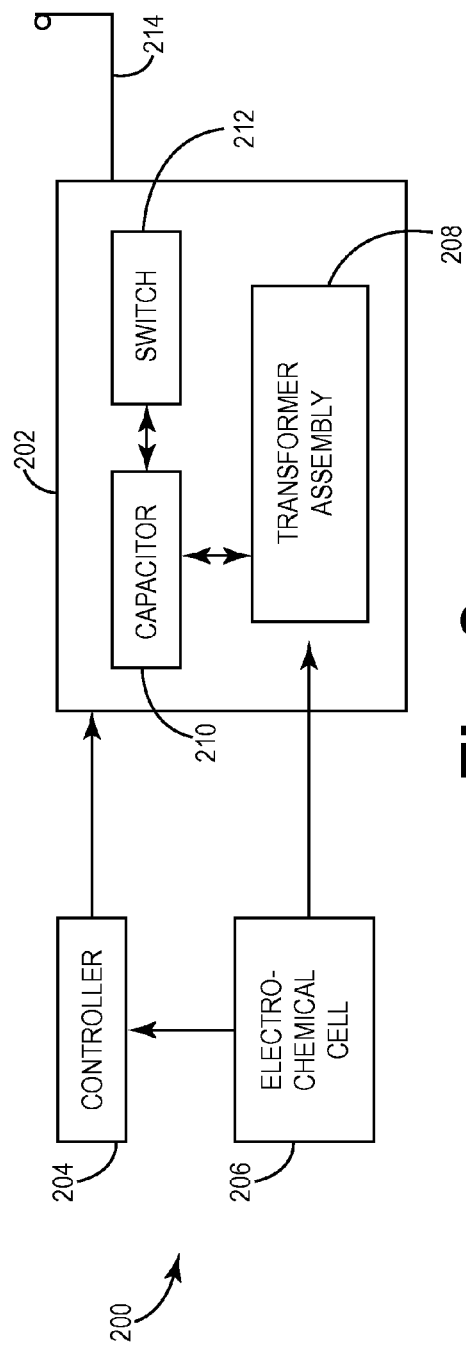
FIG. 2 is a simplified block diagram of a portion of circuitry that may be implemented within the IMD of FIG. 1.

FIG. 2 is a simplified block diagram of exemplary circuitry 200 that may be housed within IMD 100. Circuitry 200 is configured to produce pulses that are used to pace the heart; i.e., cause a depolarization of the heart tissue or issue a defibrillation pulse to shock the heart from arrhythmia to a normal heart beat. Circuitry 200 includes a pulse generating circuit 202 and a controller 204 that are both electrically coupled to an electrochemical cell 206. Although circuitry 200 includes three components, it will be appreciated that fewer or more components may be employed.

Pulse generating circuit 202 is configured to generate low or high energy pulses and to deliver the pulses to patient 102 in response to control signals from controller 204. In this regard, pulse generating circuit 202 includes a transformer assembly 208 that is coupled to at least one capacitor 210, which is in turn coupled to a delivery switch 212. Transformer assembly 208 converts the electrochemical cell voltage to an appropriate voltage suitable for charging capacitor 210. Electronic charge is accumulated in capacitor 210 until the therapy pulse is ready to be delivered, at which point delivery switch 212 is switched from an off position to an on position thereby routing the therapy pulse to appropriate leads 214.

Figure 3:
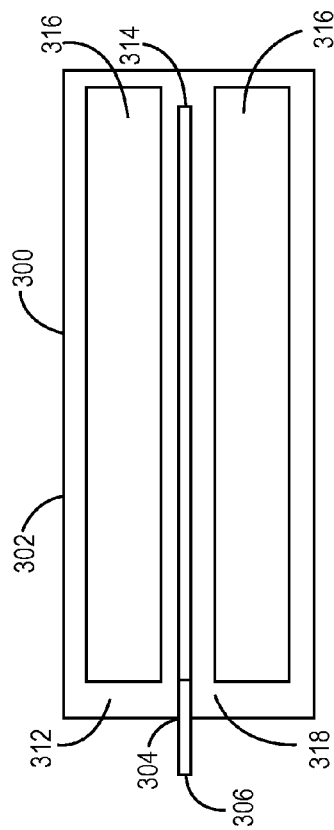
FIG. 3 is a cross-sectional view of an exemplary electrochemical cell that may be included in the circuitry of FIG. 2.

Electrochemical cell 206 is configured to provide operating power to controller 204 and pulse generating circuit 202 and is preferably capable of operating at low current drains over a long duration and providing high current pulses when therapy to patient 102 is required. FIG. 3 is a cross-sectional view of an exemplary electrochemical cell 300 that may be used in circuitry 200. Electrochemical cell 300 includes a casing 302 having any one of several shapes (e.g. clam shell, D-shaped, or etc.) within which components of electrochemical cell 300 may be disposed. Casing 302 includes an opening 304 through which a conductive pin 306 extends. Conductive pin 306 is configured to electrically couple the components of electrochemical cell 300 with pulse generating circuit 202. An electrolyte 312 is disposed within case 302 and is hermetically sealed therein.

No matter the particular configuration of electrochemical cell 300, an anode 314, a cathode assembly 316, and a separator 318 are included in electrochemical cell 300, as shown in FIG. 3. Generally, anode 314 and cathode assembly 316 are each made of conductive materials. Separator 318 is disposed between anode 314 and cathode assembly 316 and may be a space or a porous or microporous material. Examples of suitable porous or microporous material include polypropylene and polyethylene.

Anode 314 is coupled to conductive pin 306 and may have any one of a number of conventional configurations suitable for disposal within electrochemical cell 300. For example, anode 314 may be a layer of anode material that is pressed onto a current collector. Anode material may be any one of numerous suitable materials, such as, for example, lithium. Cathode assembly 316 is spaced apart from and is configured to balance the charge of anode 314. As shown in an exploded view illustrated in FIG. 4, cathode assembly 316 includes a current collector plate 320 and one or more cathode pellets 322. Current collector plate 320 increases the conductivity of current to cathode pellets 322 and thus, is preferably made of a relatively low resistance, highly conductive material. Suitable materials include, but are not limited to stainless steel, and titanium.

Current collector plate 320 includes a circumferential outer peripheral wall 324 and an inner wall 326. Circumferential outer peripheral wall 324 is configured to define a cavity 328. Inner wall 326 is coupled to circumferential outer peripheral wall 324 and extends across and separates cavity 328 into multiple regions 330, 332. In one exemplary embodiment, inner wall 326 has a height that is substantially equal to the height of circumferential outer peripheral wall 324, and an entirety of cavity 328 is separated into discrete regions 330, 332. In another exemplary embodiment, inner wall 326 has a height that is less than the height of circumferential outer peripheral wall 324; thus, only a bottom portion of cavity 328 is separated into regions 330, 332.

Figure 4:
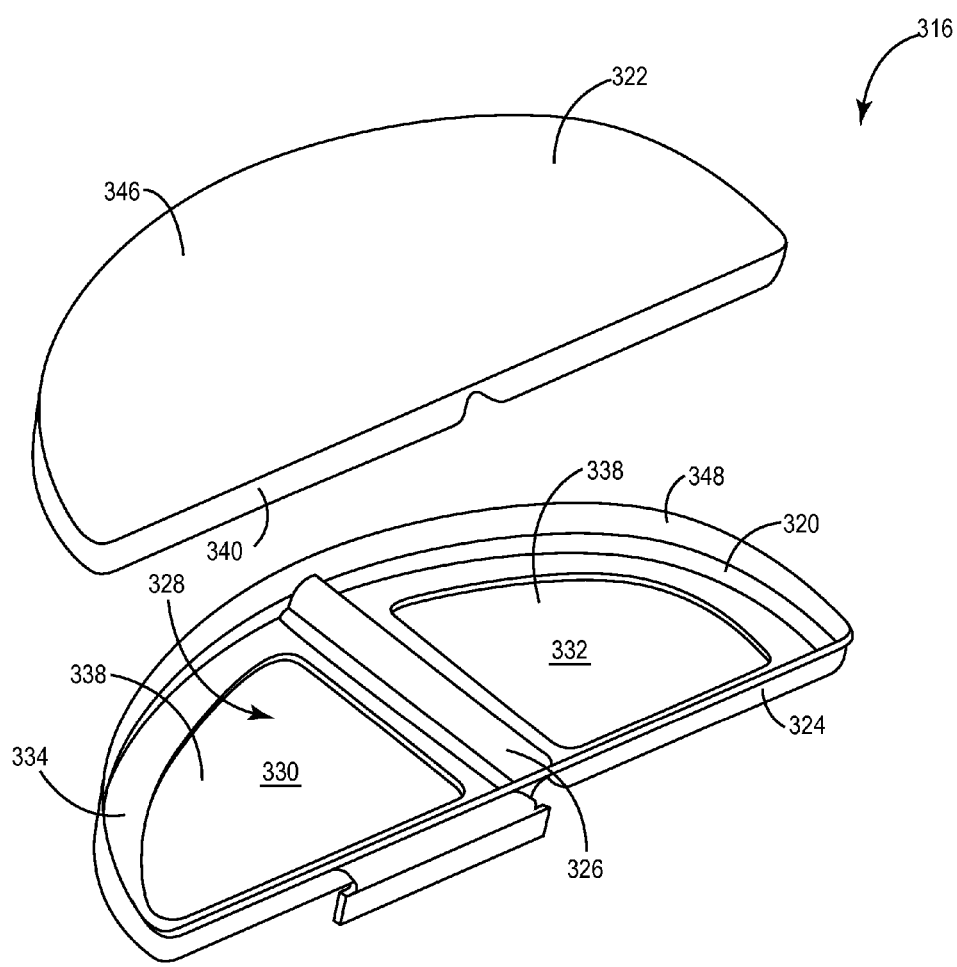
FIG. 4 is an exploded view of an exemplary cathode assembly that may be implemented within the electrochemical cell shown in FIG. 3.
Figure 5:
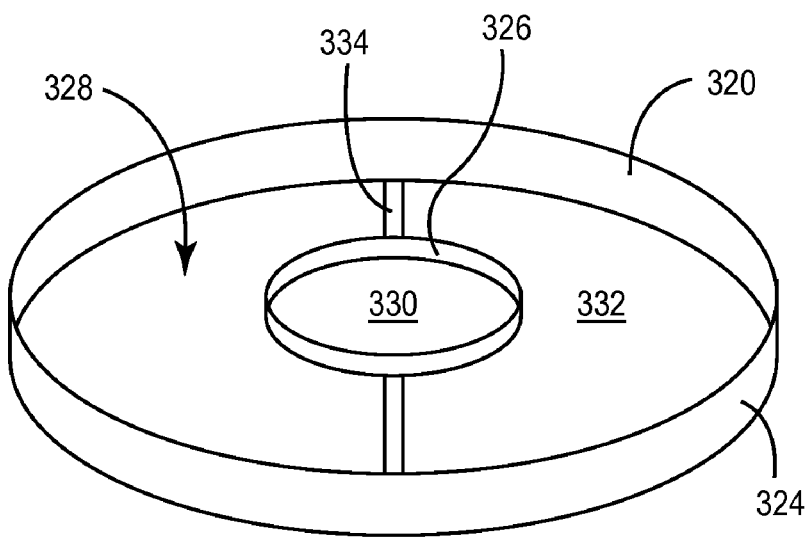
FIG. 5 is a perspective view of an exemplary current collector plate that may be implemented into the cathode assembly illustrated in FIG. 4.
Figure 6:
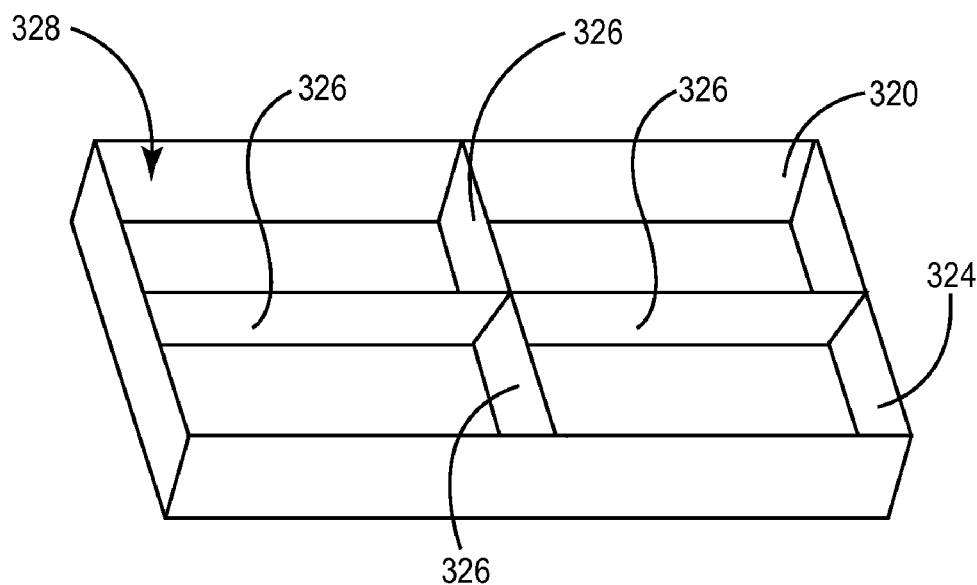
FIG. 6 is a perspective view of another exemplary current collector plate.
Figure 7:
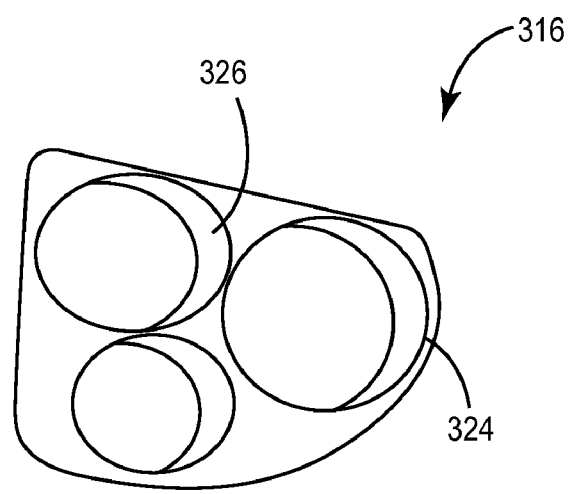
FIG. 7 is a perspective view of yet another exemplary current collector plate.

Although inner wall 326 is shown in FIG. 4 as extending substantially straight across cavity 328, inner wall 326 may have other configurations. For example, in one embodiment of current collector plate 320, as shown in FIG. 5, inner wall 326 may be annular and may be disposed in the middle of cavity 328. In such case, cavity 328 is divided into an inner region 330 and an outer region 332, and inner wall 326 may be coupled to circumferential outer peripheral wall 324 by a bottom wall 334. Alternatively, as shown in FIG. 6, more than one substantially straight inner walls 326 may be included. Consequently, inner walls 326 may form regions having various polygonal shapes (e.g. square, rectangular, hexagonal, etc.). In still other embodiments, shown in FIG. 7, inner walls 326 may have circular shapes. The particular inner wall 326 configuration selected is dependent on a variety of factors, which will be discussed in more detail below.

In some embodiments, bottom wall 334 may be included to contain pellet 328 in cavity 328. In such case, as shown in FIG. 4, bottom wall 334 may be open and may have one or more apertures 338 formed therethrough to provide access to cavity 328 from at least two sides. Alternatively, bottom wall 334 may be substantially closed.

With continued reference to FIG. 4, one or more cathode pellets 322 are disposed in current collector plate 320. Specifically, in an embodiment in which cavity 328 is divided into discrete regions 330, 332 one pellet 322 is disposed in each region 330, 332. In an embodiment in which a bottom portion of cavity 328 is divided into regions 330, 332, one pellet 322 may include a portion that is disposed in one region 330 and another portion that is disposed in the other region 332. In any case, pellet 322 occupies substantially all of a corresponding region 330, 332 and thus, has an outer peripheral surface 340 that intimately contacts and takes on the shape and contours of a corresponding adjacent circumferential outer peripheral wall 324 and/or inner wall 326. Pellet 322 also has an exposed surface 346 that is preferably flat and flush with a top edge 348 of current collector plate 320. Thus, when current collector plate 320 and pellets 322 are assembled, cathode assembly 316 has a substantially uniform thickness. However, in some cases, the thickness of pellet 322 may be slightly greater than the thickness of collector plate 320 to provide a non-abrasive surface with which other electrochemical cell 300 components may contact. Each pellet 322 is made of a compressed cathode material powder. Any one of a number of conventional cathode materials may be used, including, for example, fine grain carbon, graphite, silver vanadium oxide, and carbon monoflouride.

In addition to configuring cathode assembly 316 as described above, forces exerted by current collector plate 320 on pellet 322 may be specifically configured to further prevent pellet 322 from extending radially outside of circumferential outer peripheral wall 324. Specifically, each region 330, 332 is sized and shape such that corresponding portions of circumferential outer peripheral wall 324 and inner wall 326 exerts a predetermined inward force "$P_{cr}$" against pellet 322 that maximizes contact therebetween without distorting the shape of pellet 322. The magnitude of force "$P_{cr}$" exerted depends, in part, on the dimensional tolerances allowed for cathode assembly 316. In many cases, electrochemical cell 300 is designed to allow a cathode assembly 316 having a predetermined thickness, predetermined length, and predetermined width to be disposed therein; thus, cathode assembly 316 is configured such that $P_{cr}$ is proportional to the dimensions of cathode assembly 316. For example:

In a case in which a region has a circular horizontal cross-section:

$P_{cr} \alpha t^3/d^2$, assuming P is a uniform force around the perimeter of the region, where
t=thickness of pellet 322
d=a diameter of pellet 322.

In a case in which a region has a rectangular horizontal cross-section:

$P_{cr} \alpha [t^3(a^2+b^2)]/a^2b^2$ assuming P is a uniform force around the perimeter of the region, where
a=a length of a short side of the rectangular pellet 322
b=a length of a long side of the rectangular pellet 322.

When a region has a square-shaped horizontal cross-section:

$P_{cr} \alpha t^3/a^2$ assuming P is a uniform force around the perimeter of the region, where
a=a length of a side of the square-shaped pellet 322.

Figure 8:
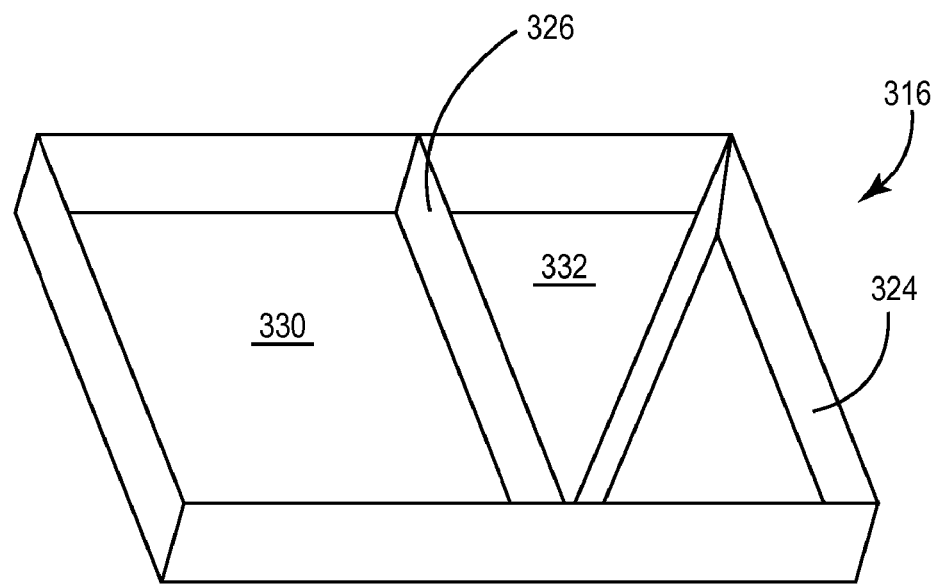
FIG. 8 is a perspective view of still another exemplary current collector plate.

For other shapes, $P_{cr}$ may be proportional to the dimensions thereof. The proportions above are maintained in each region of current collector plate 320; thus, regions 330, 332 and pellets 322, may all have the same horizontal cross sectional shape, as shown in FIG. 4, or one or more regions 330, 332 and pellets 322 may alternatively have different horizontal cross sectional shape, as shown in FIG. 8. Some cross sectional shapes may be more suitable for certain purposes than others. For example, for embodiments in which a relatively large number of pellets 322 is to be disposed in a relatively small collector plate 320, collector plate 320 may include a plurality of similarly shaped polygonal regions 330, 332 (e.g. square, hexagonal, octagonal) that are formed side-by side. It will be appreciated that although the particular magnitude of force $P_{cr}$ may also depend on other factors, such as the physical characteristics of the particular powder material to be used in pellet 322, these factors do not affect the relationship between $P_{cr}$ and the dimensions of regions 330, 332 and pellets 322.

A cathode assembly has now been provided that can maintain its original configuration over time and during discharge. The cathode assembly may be easily assembled into an electrochemical cell. In addition, the cathode assembly is capable of operating with an anode to produce a desired voltage. Moreover, although the use of current collector plate 320 and pellets 322 are described above as being used in a medical device, the current collector plate 320 may alternatively be implemented in other devices in which a pellet may need to be captured therein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. An electrochemical cell, comprising:
a current collector plate including a circumferential outer peripheral wall and an inner wall coupled to said circumferential outer peripheral wall, said circumferential outer peripheral wall defining a cavity and having a height, and said inner wall extending across and physically separating said cavity into at least two regions and having a height that is less than said height of said circumferential outer peripheral wall; and
a pellet comprising active powder material disposed in said cavity and circumferentially surrounded by and in contact with said circumferential outer peripheral wall of said current collector plate, said pellet including a first portion and second portion, said first portion disposed in a first region of said at least two regions and said second portion disposed in a second region of said at least two regions, wherein both the first portion and the second portion of the pellet are both either anode material or cathode material.

2. The electrochemical cell of claim 1, wherein said current collector plate further includes a bottom wall coupling said circumferential outer peripheral wall to said inner wall.

3. The electrochemical cell of claim 2, wherein said bottom wall includes an aperture formed therethrough.

4. The electrochemical cell of claim 1, wherein each region has an identical horizontal cross section.

5. The electrochemical cell of claim 1, wherein a first horizontal cross section shape is disposed in a first region of the at least two regions and a second horizontal cross section shape is disposed in a second region of the at least two regions.

6. The electrochemical cell of claim 1, wherein said current collector plate include a bottom wall, said inner wall is a ring insert disposed in and separating said cavity into an inner first region and an outer second region, and said inner wall is coupled to said circumferential outer peripheral wall by said bottom wall.

7. The electrochemical cell of claim 1, wherein said active powder material comprises cathode material.

8. An electrochemical cell, comprising:
a current collector plate including a circumferential outer peripheral wall and an inner wall coupled to said circumferential outer peripheral wall, said circumferential outer peripheral wall defining a cavity and having a height, said inner wall extending across and physically separating said cavity into at least two regions and having a height that is substantially equal to said circumferential outer peripheral wall height; and
a plurality of pellets comprising a compressed active powder circumferentially surrounded by said circumferential outer peripheral wall of said current collector plate, and each pellet disposed in a corresponding region of said cavity, wherein all of the plurality of pellets disposed in corresponding regions of the cavity are all either anode material or cathode material.

9. The electrochemical cell of claim 8, wherein said current collector plate further includes a bottom wall coupling said circumferential outer peripheral wall to said inner wall.

10. The electrochemical cell of claim 9, wherein said bottom wall includes an aperture formed therethrough.

11. The electrochemical cell of claim 8, wherein each region has an identical horizontal cross section shape.

12. The electrochemical cell of claim 8, wherein a first horizontal cross section shape is disposed in a first region of the at least two regions and a second horizontal cross section shape is disposed in a second region of the at least two regions.

13. The electrochemical cell of claim 8, wherein said current collector plate include a bottom wall, said inner wall is a ring insert disposed in and separating said cavity into an inner region and an outer region, and said inner wall is coupled to said circumferential outer peripheral wall by said bottom wall.

14. An electrochemical cell, comprising:
an anode;
a cathode assembly spaced apart from said anode and comprising:
a current collector plate including a circumferential outer peripheral wall and an inner wall coupled to said circumferential outer peripheral wall, said circumferential outer peripheral wall defining a cavity and having a height, and said inner wall extending across and physically separating said cavity into at least two regions and having a height that is less than said height of said circumferential outer peripheral wall; and
a cathode pellet comprising active powder material disposed in said cavity and circumferentially surrounded by and in contact with said circumferential outer peripheral wall of said current collector plate, said pellet including a first portion and second portion, said first portion disposed in a first region of said at least two regions and said second portion disposed in a second region of said at least two regions.

15. The electrochemical cell of claim 14, wherein said current collector plate further includes a bottom wall coupling said circumferential outer peripheral wall to said inner wall.

16. The electrochemical cell of claim 15, wherein said bottom wall includes an aperture formed therethrough.

17. The electrochemical cell of claim 14, wherein each region has an identical horizontal cross section shape.

18. The electrochemical cell of claim 14, wherein a first horizontal cross section shape is disposed in a first region of the at least two regions and a second horizontal cross section shape is disposed in a second region of the at least two regions.

19. The electrochemical cell of claim 14, wherein said current collector plate include a bottom wall, said inner wall is a ring insert disposed in and dividing said cavity into an inner first region and an outer second region, and said inner wall is coupled to said circumferential outer peripheral wall by said bottom wall.

* * * * *